Patented Jan. 10, 1939

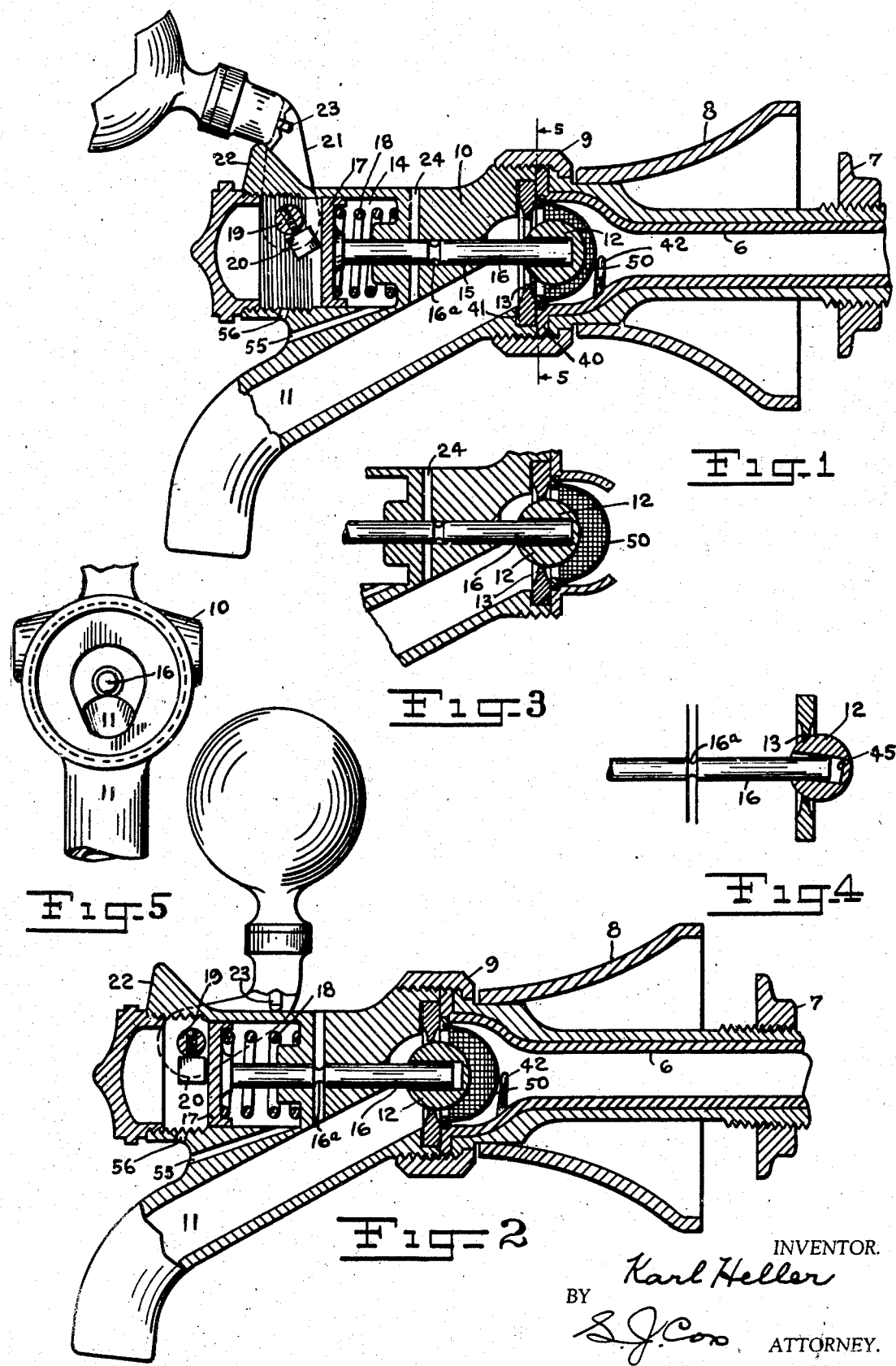

2,143,655

UNITED STATES PATENT OFFICE 2,143,655

BEER FAUCET

Karl Heller, Jersey City, N. J.

Application November 15, 1935, Serial No. 49,872

10 Claims. (Cl. 277—13)

The present improvements relate to means for controlling the flow of liquids and more particularly to liquid dispensing devices, such as taps or cocks for controlling the discharge of beer. Obviously the improvements may be employed in dispensing other beverages and other liquids, although they are particularly adapted for beer control and discharge. The invention is in the nature of an improvement on my copending applications serial Nos. 738,907, filed August 8, 1934, and 759,829, filed December 31, 1934.

A primary object of the improvements is to provide an improved faucet of sturdy and rugged construction, which is sanitary, efficient, dependable and durable. One of the chief objects, among others, is to provide an all-metal beer faucet which cannot become contaminated and which insures a reduced amount of foam with the liquid.

A further object is to provide an improved valve and valve actuating means embodying novel features of construction. Another object is to provide an improved loose ball valve and loose valve seat arrangement for beer faucets which controls the flow so as to reduce the loss of beverage. Another object is to provide a novel agency in the beer passage for regulating the foam or "head" on the discharged beer when it is at rest, ready to serve.

A further object is to provide a leak-proof beer faucet, which is of all metal construction. Another object is to provide a novel loose ball construction wherein the pressure of the beer serves to seat the valve, and the valve stem serves as a guide permitting the ball to find its own seat.

The provision of a faucet which is readily assembled or dismembered, which has a few number of parts and may be repaired and adjusted with ease, constitutes a further object of the improvements.

Another object is to improve the construction and arrangement of parts, whereby the faucet, as a unit, is trustworthy and reliable.

Other objects and advantages of the improvements will be apparent upon reference to the accompanying specification and drawing, in which—

Fig. 1 is a longitudinal section of one embodiment of the improvements illustrating the faucet in open position;

Fig. 2 is a view similar to Fig. 1, showing the valve in closed position;

Fig. 3 is a fragmentary view showing certain parts in a position between those of Figs. 1 and 2;

Fig. 4 is a fragmentary view showing the ball valve slightly out of alignment but in closed position;

Fig. 5 is a section on line 5—5 of Fig. 1, with seat ball valve, nut and washer removed.

Referring to the drawing, the faucet may be mounted upon a partition or wall member, with the metallic, block tin lined, discharge tube 6 held in rigid position with respect to such partition or wall of the container by means of the nut 7, bell shaped skirt 8, nut 9 and valve body 10.

The valve body 10 is provided with a discharge spout 11 which communicates with tube 6, to provide a passage for the liquid from the container to the exterior. Valve means for controlling the flow of liquid through said passage, in the illustrated embodiment, includes a metallic ball valve 12 and a metallic seat 13.

Athough various types of valve arrangements may be adopted, we have illustrated the improvements in the form of a reciprocating valve which may be found preferable in beer dispensing. The valve body is accordingly provided with a chamber 14 and a passage 15 concentric with the valve seat in which a valve stem 16 is disposed for reciprocation.

As described in my earlier application the stem 16 has a plunger or disc 17 welded or otherwise fixed thereto and this plunger or disc 17, has a close fit with the wall of chamber 14 thereby serving as a guide for centering the valve stem at all times with respect to the seat 13. The stem 16 also has a close fit with passage 15 which extends well forward, toward and adjacent the seat, whereby the stem is supported along the major portion of its length. This construction likewise assists in maintaining the valve and seat in effective relation, and prevents sagging of the ball and stem. A true seating of the valve on the seat is insured.

The disc 17 and stem are urged in closing direction by a spring member 18, which is disposed between the valve-body member and the plunger or disc 17. The inner face of the disc may be recessed for receiving the end of the spring and maintaining it centered.

Means for manually opening the valve in opposition to the spring 18 are provided. A pin 19 is journaled on one side of the diameter of chamber 14. In the illustrated embodiment, this pin extends through the upper half of the chamber so that the cam 20, carried by said pin, will engage the disc 17 and apply force substantially at the center thereof. In this manner, the urge of the cam is experienced at a point in alignment with the stem 16, so that the disc, stem and valve 12 are actuated in a direct line without any twisting or torque tending to throw the ball valve out of line with its seat. The pin 19 and cam 20 are rocked by means of a bifurcated handle 21, which opens the valve 12 upon movement of the handle from the position of Fig. 2 to that of Fig. 1. Upon removing the hand from said handle, the spring restores the parts to the position of Fig. 2, and the ball valve 12 closes by pressure as hereinafter described.

The degree of opening movement of handle 21 is preferably limited by a knob 22. The shock of the handle against the valve body under the urge of the spring 18 may be substantial. Repeated and hard use may be noisy as well as harmful to the parts. A cushion member 23 is therefore provided in the crotch of the handle for muffling the sound and reducing the shocks as the handle and valve are snapped to closed position.

Upon reference to Fig. 2, it is seen that a passage or air vent 24 extends through a portion of the valve body and terminates at a point near one end of spout 11 but between the ends thereof. This vent preferably is aligned with the stem 16 and extends through the body thereof. As illustrated, the passage through stem 16 is in the form of a circumferential groove 16a which establishes communication between the exterior of the body 10 and the upper side of spout 11 when the valve is closed. When the ball valve 12 is closed, as in Fig. 2, an uninterrupted air passage into spout 11, is provided. Upon opening of the ball valve however, as in Fig. 1, the stem 16 serves as a valve and cuts off the passage 24 from communication with the spout. However, subsequent closure of the ball valve is attended by concurrent opening of the vent.

Upon reference to Figs. 1 and 2, it is seen that the block tin lining 6 is extended so that the end face of the tube is provided with an integral block tin annulus 40. The adjacent face of the body member 10 is recessed for receiving a very thin metallic washer 41 and the removable and reversible valve seat 13. As illustrated, this valve seat is an annulus which rests in the recessed end face of the body member and is engaged by the block tin annulus of the tube and all these parts are clamped together in leakproof relation by means of the nut 9. The metallic ball valve 12 when closed against the seat thereby cooperates with all the surrounding elements to provide an all metal leakproof connection.

The inner periphery of the annular seat is beveled for providing a form fitting seat with the valve and should any minute leakage occur therebetween the parts may be dismembered and the seat reversed thereby providing a new seat without the expense of additional parts. The ball valve 12 is loosely mounted about the free end of stem 16 and it is seen upon reference to Fig. 2 that the stem, when the parts are at rest, is withdrawn from the inner end of the recess 45 of the ball. In opening the valve, the stem is advanced to the position of Fig. 3 before the ball is unseated, and the vent 16 is cut off at the time that the stem engages the end of the recess 45 and thereupon moves the ball from its seat. Complete opening movement carries the ball to the position in Fig. 1. In closing the valve the stem and ball travel from the position of Fig. 1 to that of Fig. 3 and thence to the position of Fig. 2. It is noteworthy in this connection that the diameter of the recess 45 exceeds the diameter of the stem 16 so that the ball is spaced in all directions from the stem. This is a great advantage because it permits the ball to seek its own seat without the stem being an obstacle to such seating.

The pressure of the beer and perhaps the buoyancy thereof serves to hold the ball valve on its seat. The stem 16 is pushed horizontally from the position of Fig. 2 and carries the ball against such pressure to the position of Fig. 1. Upon closing, the stem 16 is retracted and the pressure forces the ball towards the seat until it engages the seat in the position of Fig. 3, whereupon the stem 16 is further withdrawn to the position of Fig. 2. If upon initial engagement (Fig. 3) the ball does not find a perfect seat, the withdrawal of the stem from the valve (Fig. 2) permits the pressure to maneuver the ball to a position where it will effect a seal. The stem is therefore also a guide means for insuring the relative positions of the ball and seat and merely contributes to the closure of the valve. It will be seen upon reference to Fig. 4, that the seal may be effected without the ball being exactly in alignment with the stem.

A reticulated member 50 is provided across the beer passage. This element may be disposed at any point along the passageway either in the spout or conduit and serves to strain the beer of foreign matter and at the same time reduces the foam or head to a minimum. In the illustrated embodiment the strainer is dome shaped and has an annulus which is seated in a recessed portion of the block tin annulus. The reticulated member or strainer 50 is held in position by the clamping effect of the seat 13 and nut 9. In this particular arrangement, the strainer serves to confine the travel of the ball valve 12 should it happen to work away from the end of the stem. A stop member 42 is provided for this purpose in instances where the strainer 50 is located at another point of the passageway. Drain ports 55 and 56 are provided for chamber 14, which facilitate functioning of the disc, stem and valve as well as draining the chamber.

It is seen that in providing an all metal leakproof faucet the flavor of the beer is preserved, the loss of beer in draughting is reduced to a minimum and the dispensing is greatly accelerated. The ball valve and valve stem are preferably of Monel metal while the reversible seat is preferably German silver, and the washer and lining are block tin, the same as the coil. The strainer 50 is likewise metallic monel, and serves to clean and purify the beer as well as hold back the foam which may be generated and exist in conduit 6 and about the valve. The quality and flavor of the beer are greatly improved by the use of the strainer, and more glasses of beer can be dispensed in a given period than heretofore.

Furthermore, the improvements eliminate the wasteful "spitting" so well known to beer dispensers since any accumulation of gas or air is promptly liberated. The faucet also eliminates excessive foaming, so that little or no beer is lost and the well known various manipulations of the faucet handle and "combing" are dispensed with. Furthermore, the usual loss of beer after idle periods such as the usual morning "draw" is no longer necessary. Tests show that from twenty to forty additional glasses of beer per half barrel are saved and sold by use of the present improvements. The familiar "spouting", "dripping" and "wildness" are also eliminated. A uniform collar is provided on the glass without overfilling.

The beer dispenser can also employ the "snap back" handle to advantage, by opening it to the position of Fig. 1, and holding any number of glasses and passing them under the faucet, one by one, whereupon he may touch the handle with his elbow, and it will "snap" closed. The stream line free flow of the beer also eliminates agitation and reduces excessive foam. The quick operation of the valve and stem also reduces disturbances to a minimum. However, if more foam is desired, the operator may "jiggle" the handle, i. e., quickly reciprocate the valve several times thereby producing additional foam.

Although a beveled seat such as 13 is preferred, it is obvious that a reversible seat of uniform shape, i. e., without the bevels, may be employed. Furthermore, the seat, stem, disc, ball and related parts may be adjusted and varied in arrangement, so that passage 24 may be cut off by stem 16 either before or after ball valve 12 is unseated. Under certain conditions it may be advantageous to close passage 24 a fraction of a second after ball 12 is opened. Such an arrangement may facilitate venting of the gas back of the ball and seat, and may contribute to the elimination of "spitting" and other undesirable factors.

I claim:

1. A faucet for dispensing beer comprising a body member having a passage defining a discharge spout, a valve seat in said passage, a strainer across said passage adjacent said seat and spaced therefrom, a ball valve between said seat and strainer adapted to close by the pressure of the fluid in said passage, said ball having a recess, a reciprocating stem having a free end projecting into the area defined by said seat and disposed within said recess, said stem end being out of contact with the innermost end of said recess when the parts are in valve-closing position, and means for advancing said stem against said innermost end for opening the valve.

2. The combination with a beer faucet, of a conduit having a block tin lining, said conduit having an end faced with block tin, a separate body member having a spout in register with said conduit, a removable metal annulus disposed in one end of said body member, an annular recess in the block tin with which the conduit end is faced, a strainer across said conduit having its edges seated in said recess, and clamping means for securing together said conduit and body member, with said annulus, strainer and end facing interposed between said conduit and body member and contacting for effecting a leak-proof joint and a ball valve between said annulus and strainer which limit its movements.

3. The combination with a beer faucet, of a conduit having a block tin lining, said conduit having an end faced with block tin, a separate body member having a spout in register with said conduit, a removable metal annulus disposed in one end of said body member, an annular recess in the block tin with which the conduit end is faced, a strainer across said conduit having its edges seated in said recess, and clamping means for securing together said conduit and body member, with said annulus, strainer and end face interposed between said conduit and body member and contacting for effecting a leak-proof joint and a ball valve between said annulus and strainer which limit its movements, said annulus having beveled inner edges providing reversible valve seats for said ball valve.

4. The combination of a beverage faucet having a spout, and a conduit for conducting a beverage under pressure, valve means controlling the flow of said beverage comprising a valve seat, a ball valve held in sealing position on said seat by said pressure, means for forcing said ball from its seat, and means for freely supporting said ball in alignment with said seat, said ball valve having an aperture receiving a portion of said forcing means and being freely rotatable thereon.

5. The combination of a beverage faucet having a spout, and a conduit for conducting a beverage under pressure, valve means controlling the flow of said beverage comprising a valve seat, a ball valve held in sealing position on said seat by said pressure, means for forcing said ball from its seat, said ball valve having an aperture receiving a portion of said forcing means and being freely rotatable thereon, and means for freely supporting said ball in alignment with said seat and means for limiting the travel of said ball.

6. The combination of a beverage faucet having a spout, and a conduit for conducting a beverage under pressure, means controlling the flow of said beverage comprising a valve seat, a ball valve held in sealing position on said seat by said pressure, said ball valve having an aperture receiving a portion of said forcing means and being freely rotatable thereon, a rigid reciprocable member having a lost motion connection with said ball valve whereby said member and valve may move relatively and concurrently during reciprocation thereof for controlling the beverage flow.

7. The combination of a beverage faucet having a spout, an air vent communicating with said spout, and a conduit for conducting a beverage under pressure, means for controlling the flow of said beverage comprising a valve seat, a reciprocable stem controlling the venting of said spout, said stem having a free end projecting through the area defined by said seat, a ball valve held against said seat by the pressure of the beverage, said ball valve having a recess into which said stem end projects, the stem end being out of contact with the innermost wall of said recess, when the parts are at rest in valve closing position, so that it is spaced from said valve, a handle for advancing said stem against said ball valve and thereafter unseating it, and means for yieldingly maintaining said stem in retracted position.

8. The combination of a beverage faucet having a spout, and a conduit for conducting a beverage under pressure, means for controlling the flow of said beverage comprising a valve seat, a ball valve with a recess engaging said seat and held thereupon by the pressure of the beverage, a reciprocable stem having a free end projecting through the area defined by said seat and disposed within said recess, the end face of said stem being out of contact with the valve so that said stem and recess are positioned in spaced alignment whereby said stem may advance toward said ball and thereupon engage and shift it from said seat.

9. The combination of a beer faucet having a horizontally disposed body member having an outwardly and downwardly disposed spout, an air passage in said body member communicating between the upper side of the spout and the atmosphere, a horizontal conduit communicating with said spout and adapted to contain beer under pressure, a valve seat in the passage formed by said spout and conduit, a horizontally reciprocable stem having a recessed portion for opening and closing said air passage, said stem having a free end adjacent said seat, a ball valve held against said seat by the pressure of the beer, said valve having a horizontally disposed recess aligned with said stem, the end of said stem being disposed within said recess in all positions of said stem, a handle for advancing said stem into said recess and thereupon respectively closing the air passage and opening the beer passage, and a spring member opposing such advancement.

10. The combination of a beverage faucet having a spout, and a conduit for conducting a beverage under pressure, means for controlling the flow of said beverage comprising a valve seat, a reciprocable stem having a free end projecting through the area defined by said seat, a ball valve with a recess engaging said seat and held thereupon by the pressure of the beverage, a reciprocable stem having a free and projecting through the area defined by said seat and disposed within said recess, the end face of said stem being normally out of contact with the valve so that said stem and recess are positioned in spaced alignment whereby said stem may advance toward said ball and thereupon engage and shift it from said seat and means for retracting said stem independently of said ball.

KARL HELLER.